United States Patent [19]
Kopper et al.

[11] Patent Number: 5,164,902
[45] Date of Patent: Nov. 17, 1992

[54] DRIVE SLIP CONTROL SYSTEM

[75] Inventors: Werner Kopper, Brighton; Werner Schiele, Farmington Hills, both of Mich.

[73] Assignee: Robert Bosch GmbH, Stuttgart, Fed. Rep. of Germany

[21] Appl. No.: 662,332

[22] Filed: Jan. 25, 1991

Related U.S. Application Data

[63] Continuation of Ser. No. 350,526, Apr. 5, 1989, abandoned.

[30] Foreign Application Priority Data

Oct. 8, 1986 [DE] Fed. Rep. of Germany ....... 3634240

[51] Int. Cl.$^5$ .............................................. B60T 8/32
[52] U.S. Cl. .......................... 364/426.02; 364/426.03; 180/197; 303/95
[58] Field of Search ..................... 364/426.02, 426.03; 180/197; 303/100, 102, 103, 106, 95

[56] References Cited

U.S. PATENT DOCUMENTS

| | | | |
|---|---|---|---|
| 4,164,360 | 8/1979 | Jones | 303/106 |
| 4,504,911 | 3/1985 | Braschel et al. | 364/426.02 |
| 4,511,971 | 4/1985 | Dittner et al. | 364/426.02 |
| 4,679,146 | 7/1987 | Kubo | 364/426.02 |
| 4,762,196 | 8/1988 | Harada et al. | 180/197 |
| 4,771,850 | 9/1988 | Matsuda | 180/197 |
| 4,778,025 | 10/1988 | Sakaguchi et al. | 180/197 |
| 4,866,623 | 9/1989 | Ise et al. | 180/197 |
| 4,917,208 | 4/1990 | Komoda | 180/197 |
| 4,944,358 | 7/1990 | Wazaki et al. | 180/197 |
| 4,959,794 | 9/1990 | Shiraishi et al. | 364/426.03 |

Primary Examiner—Gary Chin
Attorney, Agent, or Firm—Felfe & Lynch

[57] ABSTRACT

A drive slip control system for a motor vehicle which brakes a driven wheel when that wheel begins to slip and which reduces engine torque when both driven wheels begin to slip on the pavement. The action of the drive slip control system is inhibited when the engine speed falls below a preset speed, such as the engine idle speed.

3 Claims, 1 Drawing Sheet

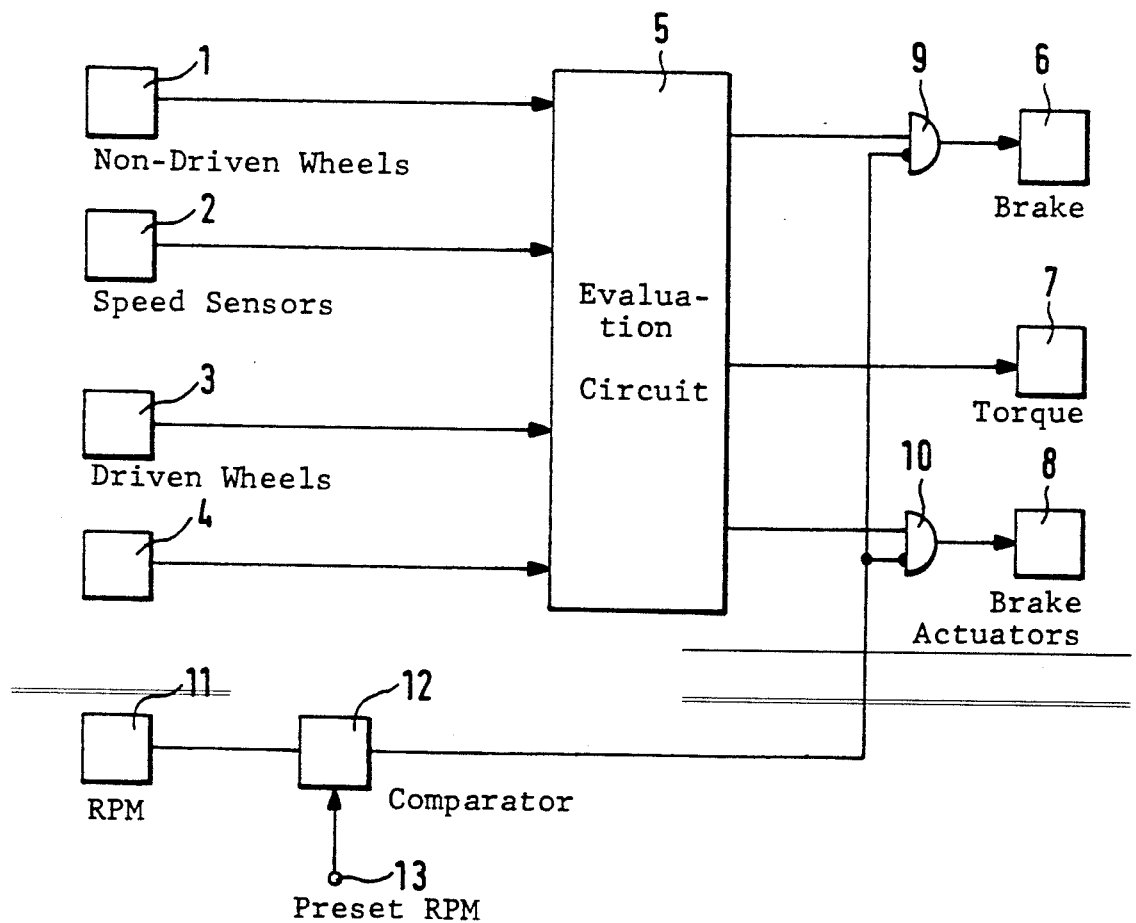

DRIVE SLIP CONTROL SYSTEM

This application is a continuation of application Ser. No. 350,526, filed Apr. 5, 1989 now abandoned.

BACKGROUND OF THE INVENTION

The present invention relates to a drive slip control system for a motor vehicle which brakes a driven wheel when that wheel begins to slip and which reduces engine torque when both driven wheels begin to slip on the pavement.

A drive slip control system of this type is known from the European patent No. 0,064,669. To prevent stalling of the engine, further decrease of the engine torque is prevented when the engine speed falls below the idle speed. This is accomplished by continuously comparing the engine speed with a preset speed, such as the idle speed, and reducing the action of the drive slip control system when the engine speed falls below this preset speed.

This system has the disadvantage that the engine will stall if the brakes are applied by the vehicle operator to prevent wheel slip.

SUMMARY OF THE INVENTION

It is an object of the present invention to provide a drive slip control system which prevents stalling of the engine due to the application of the vehicle brakes.

This object, as well as other objects which will become apparent from the discussion that follows, are achieved, according to the present invention, by continuously monitoring the engine speed and inhibiting the application of a wheel braking force when the engine speed falls below a preset speed, such as the idle speed.

For a full understanding of the present invention, reference should now be made to the following detailed description of the preferred embodiment of the invention and to the accompanying drawing.

BRIEF DESCRIPTION OF THE DRAWINGS

The single FIGURE of the drawing is a block diagram of a drive slip control system in accordance with the preferred embodiment of the invention.

DESCRIPTION OF THE PREFERRED EMBODIMENT

A preferred embodiment of the invention is shown in the single figure of the drawing in the form of a block diagram. Wheel-speed sensors 1 and 2 associated with the nondriven wheels, and sensors 3 and 4 associated with the driven wheels provide signals to an evaluation circuit 5. Actuators 6 and 8 associated with the two driven wheels apply the brakes when they are energized. A further actuator decreases the engine torque when energized.

When the evaluation circuit 5 determines that one of the driven wheels is slipping or tends to slip, which can be determined by comparing the speeds of the driven and nondriven wheels and/or by ascertaining excessive wheel acceleration, the associated actuator 6 and/or 8 is energized and brake pressure is applied to the associated wheel brake.

When both wheels exhibit a tendency to slip, the engine torque is decreased by means of the actuator 7.

However, the application of the brakes to the wheels is prevented by means of AND gates 9 and 10 when a comparator 12 determines that the engine speed, measured by the sensor 11, is below a speed preset by a signal at the terminal 13. The comparator 12 then delivers an inhibit signal to the inverted inputs of the AND gates 9 and 10. The preset speed is preferably the engine idle speed.

There has thus been shown and described a novel drive slip control system which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention which is limited only by the claims which follow.

We claim:

1. A drive slip control system for a motor vehicle having two driven wheels and brakes at each of said driven wheels, said control system comprising:
    means for determining when at least one of the driven wheels is slipping,
    actuator means for applying brake pressure to the brakes at at least one of the driven wheels when slipping is determined,
    means for comparing the engine speed with a preset speed, and
    means for preventing said actuator means from applying brake pressure at said at least one of said driven wheels when the engine speed falls below the preset speed.

2. The control system defined in claim 1 wherein said preset speed is the engine idle speed.

3. The control system defined in claim 1, further comprising means for reducing engine torque when both of said driven wheels are slipping.

* * * * *